Figure 5:
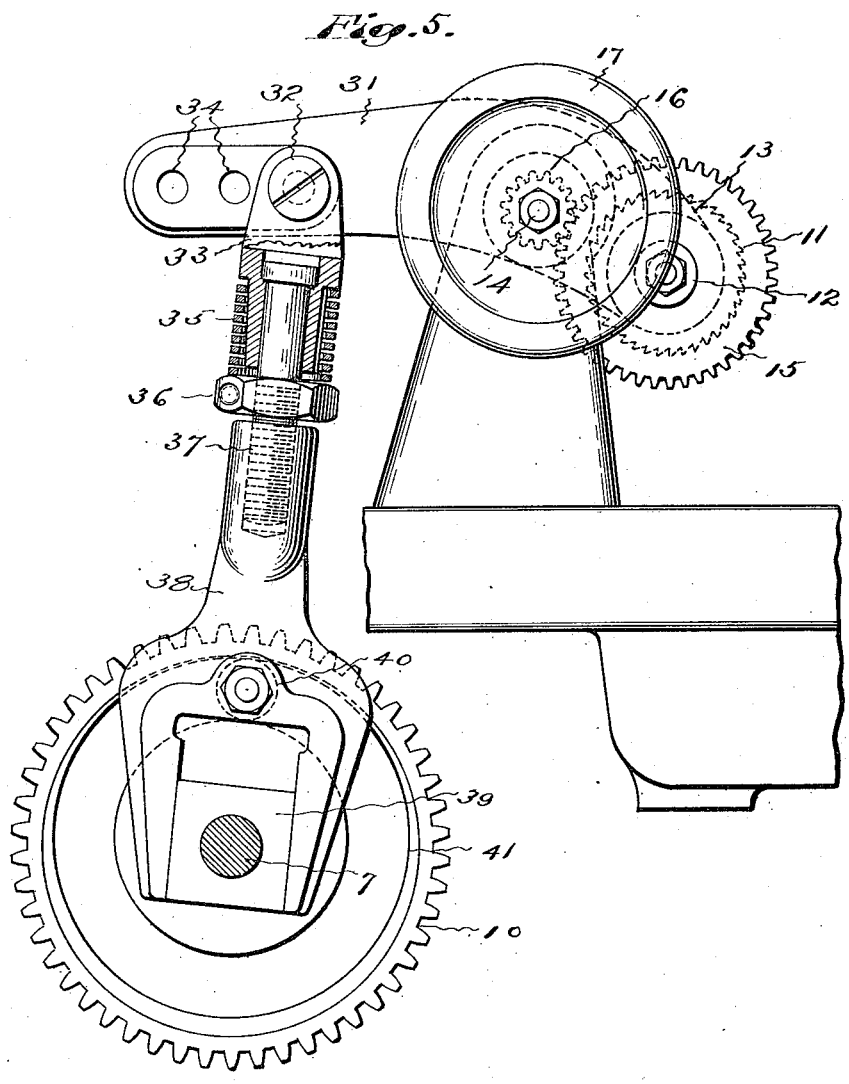

C. T. BRENNAN.
SCREW SLOTTING MACHINE.
APPLICATION FILED JUNE 20, 1914.
1,132,553.
Patented Mar. 23, 1915.
4 SHEETS—SHEET 1.
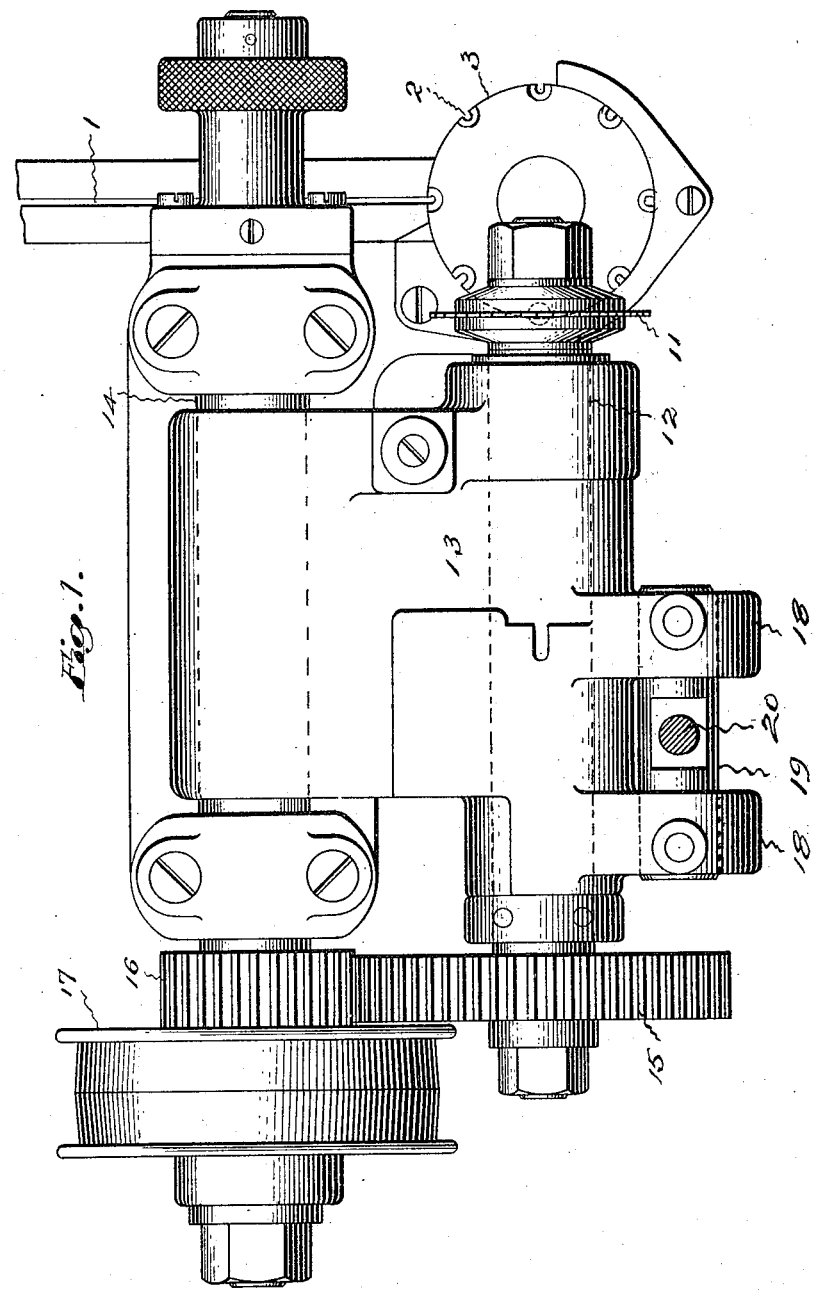

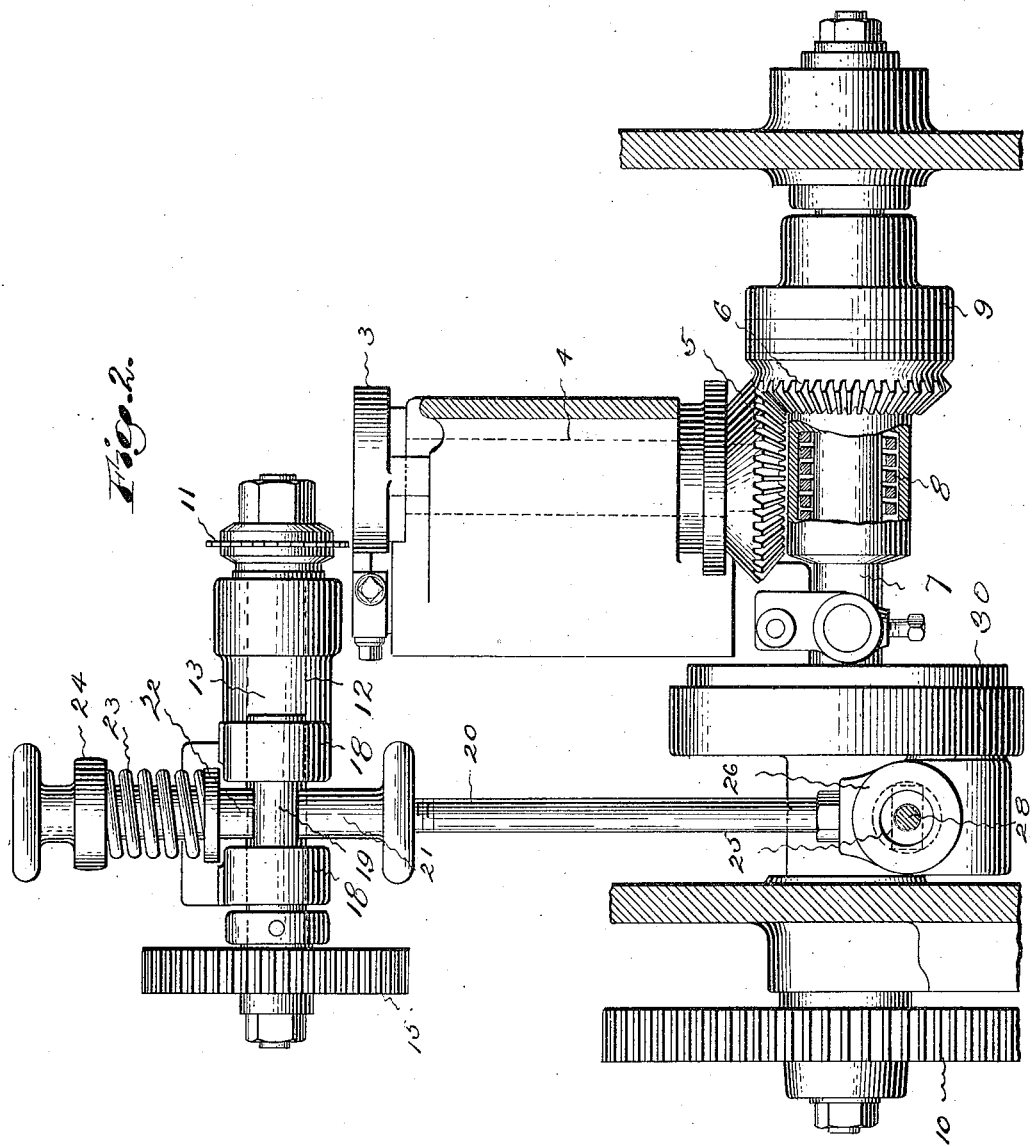

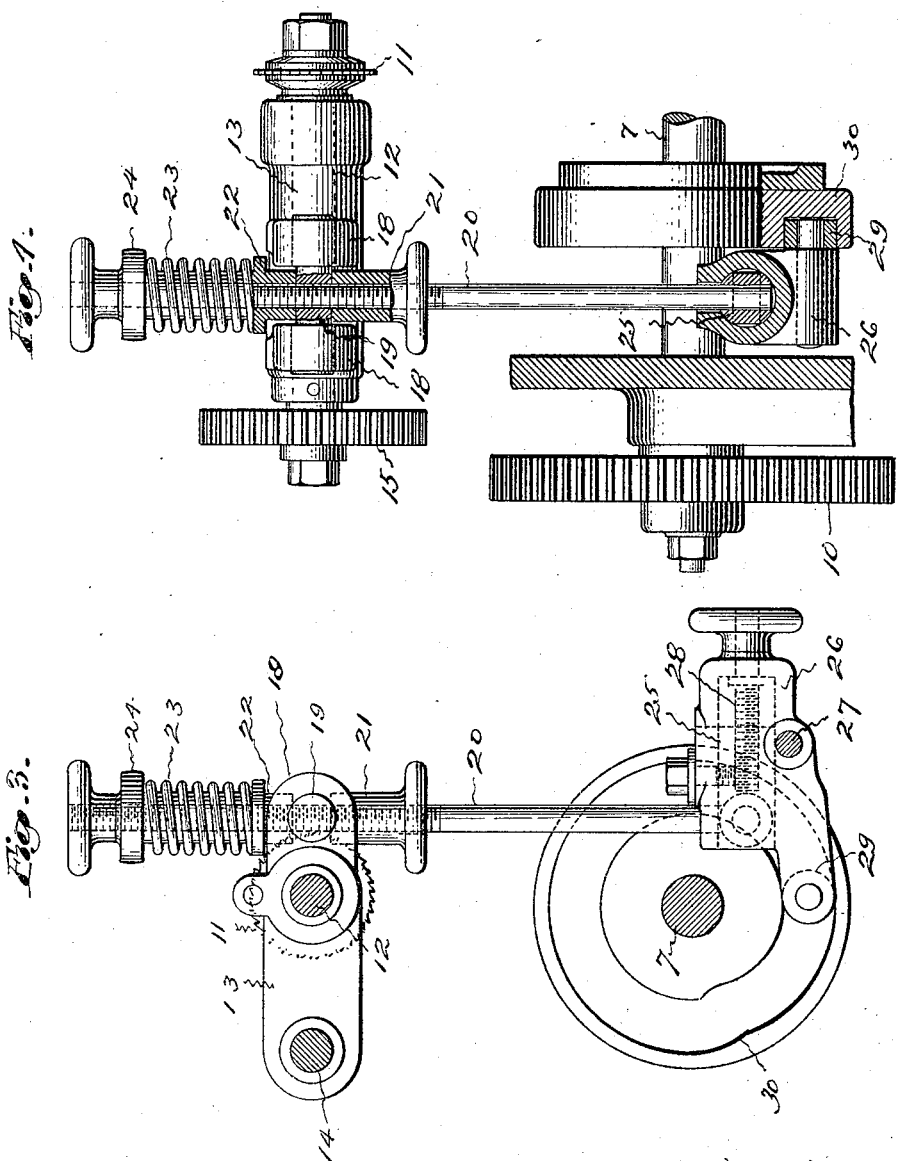

C. T. BRENNAN.
SCREW SLOTTING MACHINE.
APPLICATION FILED JUNE 20, 1914.

1,132,553.

Patented Mar. 23, 1915.
4 SHEETS—SHEET 4.

UNITED STATES PATENT OFFICE.

CHARLES T. BRENNAN, OF WATERBURY, CONNECTICUT, ASSIGNOR TO THE E. J. MANVILLE MACHINE COMPANY, OF WATERBURY, CONNECTICUT, A CORPORATION OF CONNECTICUT.

SCREW-SLOTTING MACHINE.

1,132,553.  Specification of Letters Patent.  Patented Mar. 23, 1915.

Application filed June 20, 1914. Serial No. 846,263.

*To all whom it may concern:*

Be it known that I, CHARLES T. BRENNAN, a citizen of the United States, residing at Waterbury, in the county of New Haven and State of Connecticut, have invented a new and useful Improvement in Screw-Slotting Machines, of which the following is a specification.

This invention relates to a mechanism which is provided for oscillating the rotatory slotting saw of an automatic screw slotting machine, into and out of engagement with the heads of the screw blanks.

Occasionally in a rapid running automatic slotting machine the blanks will be fed improperly with a result, particularly if the blanks are of hard metal, that the mechanisms are liable to be jammed and perhaps broken or injured. When the screw blanks are of so called "high speed" steel the saw when starting to cut has a tendency to dig into the heads with a likelihood of breaking out saw teeth and injuring the blanks or at least forming imperfect slots.
The object of the invention is to so construct the mechanism which oscillates the saw carrying head of an automatic screw slotting machine, that the parts will not jam or become broken or injured should a screw blank be misplaced in the blank carrying dial, and that all tendency for the saw when it starts to cut, to dig into the heads of the blanks and become broken or to form imperfect slots will be eliminated.
Machines of this class are well known to those familiar with this art, and only so much of the mechanism of such machines as is necessary to a full understanding of the particular feature of improvement which forms the subject of my invention and by which the object is attained, is shown and described herein.

Of the accompanying drawings Figure 1 shows a plan of the swinging saw-carrying-head and the coöperating parts of an automatic screw slotter, arranged according to this invention. Fig. 2 shows a front elevation of the same. Fig. 3 shows a side elevation of the saw-head oscillating-mechanism.
Fig. 4 shows a front elevation of the head oscillating mechanism, with parts in section to show the construction. Fig. 5 shows a side elevation of a modified form of the saw-head oscillating-mechanism.

The screw blanks are fed down a guide-way 1 into recesses 2 in the edge of the dial 3, Fig. 1, by any of the well known blank feeding mechanisms which are common in this art. The dial is mounted on the upper end of an arbor 4 that on its lower end has a beveled gear 5 which meshes with a beveled gear 6 that is frictionally connected with a shaft 7 by the spring 8 and collar 9. On the outer end of this shaft is a driving gear 10, Fig. 2. By this mechanism the dial is rotated for carrying the blanks from the feed guide-way to beneath the slotting saw, in the well known way.

The slotting saw 11 is clamped on an arbor 12 that is mounted in the front or swinging end of the head 13. This head is pivotally mounted on a shaft 14. On the end of the saw arbor is a gear 15 that meshes with a pinion 16 which is connected with the driving pulley 17 on the shaft 14, Fig. 1.
By means of this pulley, pinion and gear, the saw arbor is rotated continuously at a high rate of speed.

Projecting forwardly from the outer end of the swinging saw-carrying-head are two ears 18 and pivotally carried by these ears is a block 19. Extending through an opening in this block is a rod 20, on a threaded portion of which below the block is a nut 21. On the rod above the block is a loose fitting collar 22 that is thrust downward by a spring 23, the tension of which is adjusted by the thumb nut 24 that is screwed upon the upper end of the rod, Figs. 3, 4.

The lower end of the rod is hinged in a block 25 that is adjustably mounted in a part of a lever 26. The block 25 is adjusted along the lever, in and out from the axis 27 of the lever, by means of a screw 28. On the end of the lever is a roll 29 that lies in a cam groove in the face of the cam disk 30 which is on the shaft 7. The rotation of this cam oscillates the lever and reciprocates the rod up and down a distance depending upon the location of the end of the rod with relation to the axis of the lever. When the cam causes the rod to move upward the swinging head, in this form of the mechanism, is lifted by the engagement of the nut 21 with the underside of the block 19 that is carried by the ears which project from the head. This positively lifts the saw away from the blank carrying dial. When the rod is drawn down the head is swung downward by the engagement of the sleeve 22 with the upper side of the block 19. The tension of the spring 23 is such that normally the head will be swung down with sufficient power, whenever the rod is drawn down by the lever and cam, for the saw to perform its work. However should the saw catch in the blank or should anything interfere with the free movement of the saw or head downward, the spring will yield and thus relieve the force so as to prevent any of the parts from breaking, or the screw blank that is to be slotted from being damaged. By means of this arrangement of mechanism the saw-head is lifted from the blank positively and is drawn down to its work with a yielding or cushioned force so that there is no danger of any of the parts becoming broken or a blank becoming injured. The amount of swing of the head is adjusted according to the size of the blanks to be slotted.

In the form of mechanism above described the saw is drawn down to its work with a cushioned force and is pushed up from the blanks positively. In the form shown in Fig. 5 this action is reversed. The saw 11 is clamped on an arbor 12 to which is attached a gear 15 that meshes with a pinion 16 on the driving pulley shaft 14 on which the head 13 is hung, as above explained. In this case an arm 31 projects rearwardly from the head and hinged to this arm by a screw stud 32 is a link 33. The point of connection of the link with the arm can be varied by changing the stud into either of the holes 34 in the arm. By this means the amount of swing of the head may be varied. Thrusting upward against the link is a spring 35 that bears against a nut 36 on a threaded stem 37. The headed upper end of this stem is loose in the link and the lower end is screwed into the upper end of a connecting rod 38, Fig. 5. The lower end of this connecting rod is forked and embraces a guide-block 39 on the shaft 7 which carries the driving gear 10. On one side of the connecting rod is a roll 40 that lies in a cam groove 41 in the face of the driving gear. When the cam lifts the connecting rod the arm is pushed up and the head oscillated so that the saw is swung down. This as stated is accomplished through the spring 35 so that the downward movement of the saw is cushioned allowing the saw to yield in case the blank is displaced or the saw tends to dig into the metal of the head. When the connecting rod is drawn down the saw is lifted positively.

The invention claimed is:

1. In a screw slotting machine the combination with a blank holder, of a movable head, a slotting saw carried by said head toward and from the blank holder, means for rotating the saw, mechanism for moving the head, and a yielding connection between said head moving mechanism and the head, whereby the movement of the saw toward the blank holder is cushioned.

2. In a screw slotting machine the combination with a blank holder, of an oscillatory head, a slotting saw carried by said head toward and from the blank holder, means for rotating the saw, mechanism for oscillating the head, and a yielding connection between said head oscillating mechanism and the head, whereby the swing of the saw toward the blank holder is cushioned.

3. The combination in a screw slotting machine of a blank holder, a swinging head, a slotting saw carried by said head toward and from the blank holder, means for rotating the saw, and mechanism for oscillating the head, said mechanism positively moving the head and the saw away from the blank holder and yieldingly moving the head and the saw toward the blank holder.

4. In a screw slotting machine the combination of a blank holder, a saw, an arbor carrying the saw, means for rotating the arbor, a head supporting the arbor, and mechanism for oscillating the head, said mechanism being arranged to swing the head positively in one direction and yieldingly in the other direction.

5. The combination in a screw slotting machine of a blank holder, a saw, an arbor carrying said saw, a gear for rotating the arbor, a swinging head supporting the saw, arbor and gear, a cam for oscillating the head, a connecting rod between the cam and the head, and means on the connecting rod for positively swinging the head in one direction and yieldingly swinging the head in the opposite direction.

6. In a screw slotting machine in combination, a blank holder, a slotting saw, a swinging head carrying the slotting saw, means for rotating the saw, a cam for oscillating the head, a connecting rod reciprocated by the cam, means positively attached to the connecting rod on one side of the head, and means yieldingly mounted on the connecting rod on the other side of the head, for oscillating the head and the saw carried thereby.

7. In a screw slotting machine in combination, a blank holder, a swinging head, an arbor carried by the head, a slotting saw on one end of the arbor, a rotating gear on the other end of the arbor, a cam for swinging the head, a connecting rod reciprocated by the cam, a nut on the connecting rod for moving the head in one direction, and a spring on the connecting rod for moving the head in the opposite direction.

8. In a screw slotting machine in combination, a swinging head, a saw carried by said head, means for rotating the saw, mechanism for oscillating the head, a connecting rod between said oscillating mechanism and the head, a fixed part connecting said rod and the head on one side and a yielding part connecting the rod and the head on the other side.

CHARLES T. BRENNAN.

Witnesses:
   David Julian,
   Nath. R. Bronson.

Copies of this patent may be obtained for five cents each, by addressing the "Commissioner of Patents, Washington, D. C."